Patented Mar. 4, 1924.

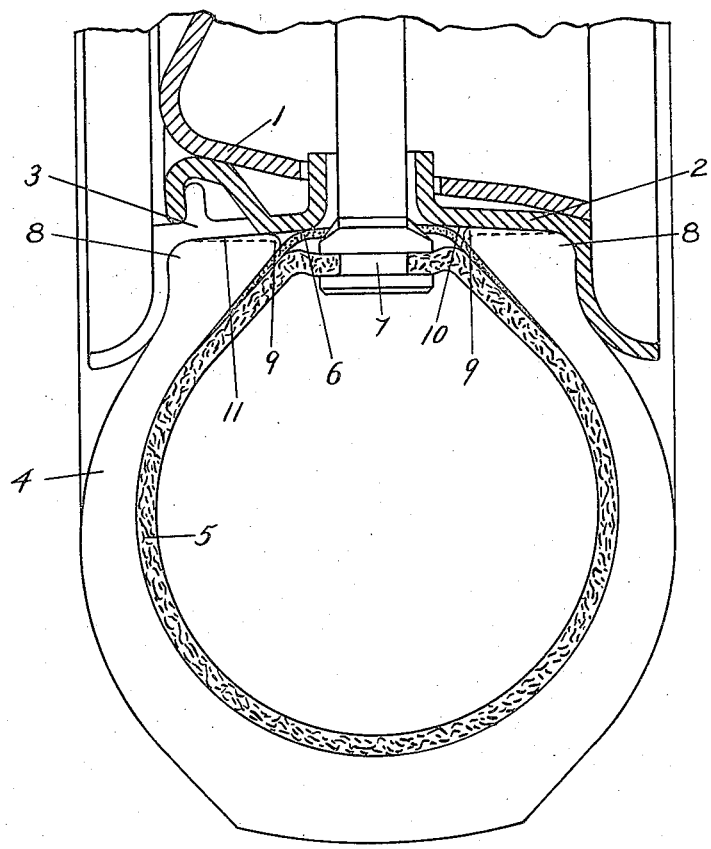

1,485,709

UNITED STATES PATENT OFFICE.

SYDNEY I. PRESCOTT, OF NEW YORK, N. Y., AND FRANCIS J. RUMMLER, OF LYNDHURST, NEW JERSEY.

TIRE RIM.

Application filed February 8, 1922. Serial No. 534,975.

*To all whom it may concern:*

Be it known that we, SYDNEY I. PRESCOTT and FRANCIS J. RUMMLER, citizens of the United States, respectively residing in the city, county, and State of New York, and the town of Lyndhurst, county of Bergen, and State of New Jersey, have invented a new and useful Improvement in Tire Rims, of which the following is a specification.

This invention relates to an improvement in tire rims, particularly to those of the straight side tire type.

Straight side tires as at present made have two cylindrical rim engaging surfaces of equal diameter, and rims to carry such tires as heretofore made have a cylindrical tire supporting seat in conformity to and but slightly smaller than the rim engaging surfaces of the tires. Both split and continuous or endless rims have been so made and are in use. It is a common occurrence for such tires to become rusted fast to their rims after having been in service for a considerable time without replacement. When this occurs, considerable difficulty and loss of time is experienced in removing a tire from its rim, especially when the rim is of the endless type, because there is nothing to break the rust connection and the tire must be forced off the rim against the high frictional resistance thereof.

The main object of the present invention is the production of a rim which obviates this difficulty, and it has been discovered that the desired end can be attained by producing rims each provided with a tire supporting seat in non-conformity to the rim engaging surfaces of a tire and permitting deflection of the tire under inflation on the rim to cause it to engage and be fully supported by said seat, so that when the tire is punctured or otherwise deflated it will automatically return to its form as made, tearing itself away from the rust on the rim but remaining thereon, though free for easy and rapid removal. With this and other objects not specifically mentioned in view, the invention consists in certain constructions which will be hereinafter fully described and then specifically set forth in the claims hereunto appended.

The accompanying drawing, which forms a part of this specification, and in which like characters of reference indicate the same or like parts, is a cross sectional view of a rim constructed in accordance with the invention and shown as carrying a straight side tire and as being carried by a wheel body of the disc type.

In carrying the invention into effect, there is provided a straight side tire rim provided with a tire supporting seat in non-conformity to the rim engaging surfaces of a tire, whatever the form of said surfaces may be. This seat is but slightly out of conformity to the rim engaging surfaces of the tire, because the rust has practically no tensile strength and only a slight force exerted in a slight retreating movement is required to break the rust connection and free the tire. In the best constructions, the tire supporting seat is adapted to engage the heels of the beads of a tire as made, and full engagement and tire support is attained by deflection of the toes of the beads under inflation on the rim.

Referring to the drawing, which illustrates but one of numerous possible concrete embodiments of the invention, 1 indicates the rim supporting section of a wheel body of the disc type, and mounted on this section is a rim comprising an endless section 2 and a removable split section 3. Mounted on this rim is a tire shoe 4 indicated in outline and carrying an inner tube 5, a flap 6, and a projecting tire valve stem 7, all of the usual construction. The rim engaging surfaces of the shoe 4, as made, are as usual cylindrical in form, as indicated by the dotted lines in the drawing. The shoe 4 has as usual two beads each having an annular heel 8 and an annular toe 9. The tire is shown in inflated condition on the rim with its bead toes 9 deflected by the air pressure into full engagement with a tire supporting seat in part formed at 10 on the endless section 2 and in part formed at 11 on the split section 3 of the rim. This seat tapers slightly from its largest diameter at its sides adjacent the heels 8 to its smallest diameter in its midsection, and it is in non-conformity with the rim engaging surfaces of the tire as made and as indicated by the dotted lines in the drawing.

When the tire is punctured or otherwise deflated, the resiliency of the material of which the tire is made causes the toes 9 to automatically return to their original form as indicated by the dotted lines, and this breaks any rust which may have formed between the rim engaging surfaces and the tire seat, leaving the tire free to be easily and quickly demounted.

Changes and variations within the scope of the claims may be made in the structure by means of which the invention is carried into effect. The invention therefore is not to be restricted to the precise details of the structure shown and described.

What is claimed is:

1. A straight side tire rim comprising an endless section and a split section and provided with a tire supporting seat in part formed by each section and slightly tapering from its largest diameter at its sides to its smallest diameter in its mid-section in nonconformity to the cylindrical rim engaging surfaces of a tire as made, but adapted to be engaged by and to fully support said tire when deflected by inflation on said rim.

2. A straight side tire rim comprising an endless section and a split section and provided with a tire supporting seat in part formed by each section and in nonconformity to the rim engaging surfaces of a tire as made, but adapted to be engaged by and to fully support said tire when deflected by inflation on said rim.

In testimony whereof, we have signed our names to this specification.

SYDNEY I. PRESCOTT.
FRANCIS J. RUMMLER.